UNITED STATES PATENT OFFICE.

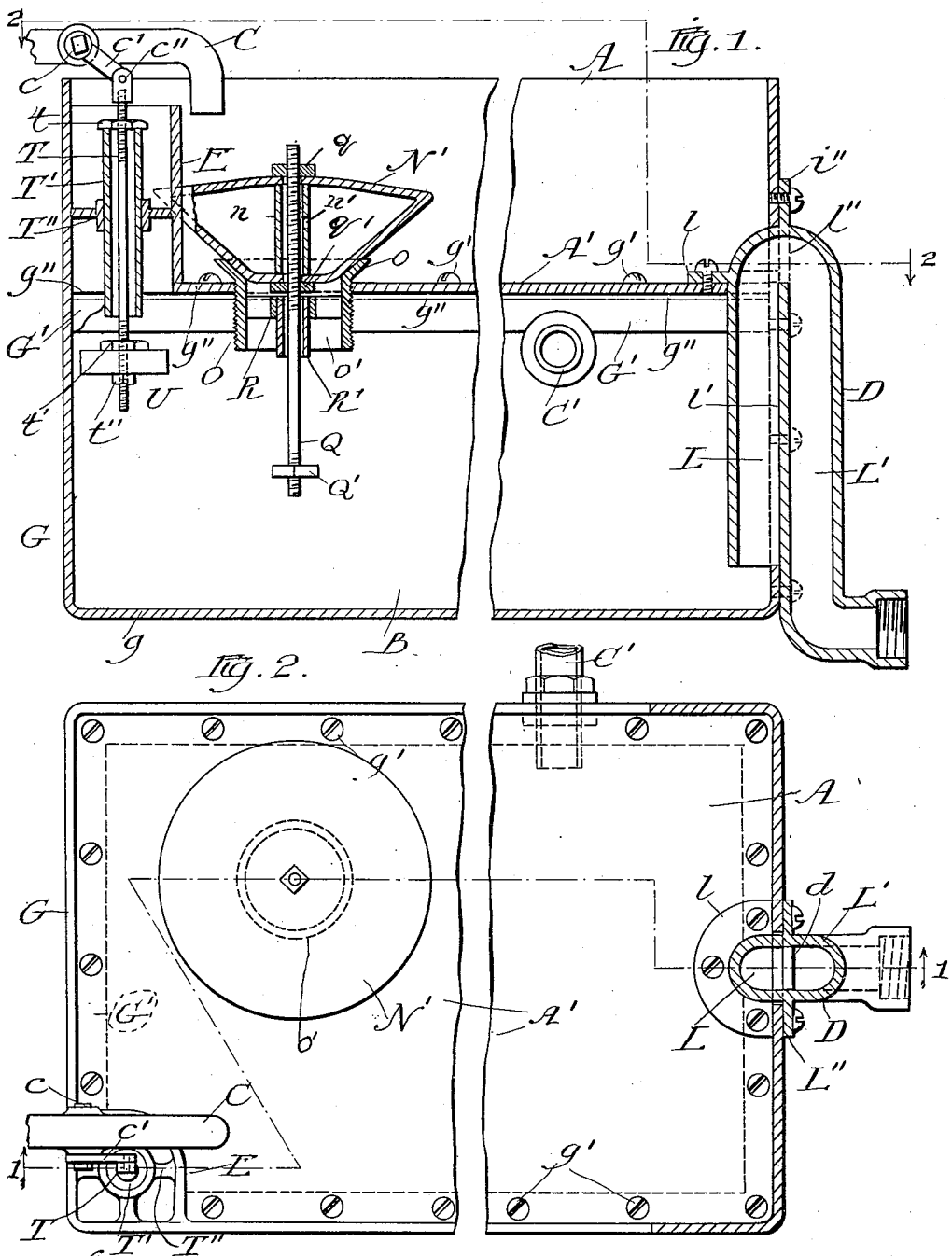

PATRICK J. MADDEN, OF CHICAGO, ILLINOIS.

FLUSHING APPARATUS.

1,096,176.     Specification of Letters Patent.     Patented May 12, 1914.

Original application filed July 17, 1909, Serial No. 508,186. Divided and this application filed July 22, 1909. Serial No. 508,965.

*To all whom it may concern:*

Be it known that I, PATRICK J. MADDEN, a citizen of the United States, residing at Chicago, in the county of Cook and State of Illinois, have invented certain new and useful Improvements in Flushing Apparatus, of which the following is a specification.

The present invention relates to an apparatus having a tank, means for automatically starting the discharge of the liquid contents thereof when said liquid reaches a given level and allowing the discharge to continue until the tank is emptied or practically emptied, means for thereupon automatically conditioning the tank to refill to the aforesaid level at which the preceding discharge started, and means for again automatically starting the discharge, thereby producing an intermittent discharge. The term "tank" as used in this specification comprehends a receptacle of any desired construction, having any desired number of separate compartments, chambers or sub-tanks, so long as it will meet the requirements of the invention. As practical examples of the use of such automatic, intermittently discharging flushing tanks, mention may here be made of flushing tanks for plumbing fixtures of various kinds and used for various purposes, filter beds and tanks used in systems for the treatment of sewage for purifying it, and tanks, generally, for whatever purpose they may be used, which it is desired to automatically and alternately fill and empty, so that the discharges will be intermittent.

The subject of the present invention is one species of a flushing apparatus of the character indicated, a number of other species, falling under a common genus, being shown and described in an application of even date herewith, Serial No. 508,186, in which the several species are covered generally and one of said species is covered specifically.

The specific form of flushing apparatus herein shown, described and claimed may be used for any of the purposes above indicated, but it was designed and intended and is particularly adapted for use in systems for the treatment of sewage for purifying it.

The invention consists in the features of novelty that are hereinafter described with reference to the accompanying drawing which is made a part of this specification and in which:—

Figure 1 is a vertical sectional elevation of a flushing apparatus embodying the invention. Fig. 2 is a view thereof partly in plan and partly in horizontal section on the line 2—2, Fig. 1.

A flushing apparatus embodying the invention comprises two chambers or sub-tanks, A and B, hereinafter called the "priming" tank and the "main" tank, respectively, both of which are open to atmosphere, whereby atmospheric pressure is maintained within them. The tank A is appropriately called the "priming" tank, because upon the automatic bringing about of certain conditions hereinafter fully described, it will rapidly discharge a sufficient quantity of its liquid contents into the main tank to prime and set in action a siphon D by which the liquid contents of the main tank is drawn off. The two tanks are made up of a rectangular box G, preferably cast in one piece and comprising four vertical side walls and a bottom $g$, which constitutes the bottom of the main tank, and a horizontal partition A' which divides the interior of the box G into the two tanks and forms the bottom of the priming tank and the top of the main tank. This partition is supported at its edges by a shoulder G' which surrounds the box on the interior thereof and is preferably integral therewith and the partition is secured in place on the shoulder by bolts or screws $g'$ or other suitable means, and preferably a packing or cement $g''$ of any suitable material is interposed between them for forming a liquid tight joint. The liquid for priming the siphon is introduced into the priming tank by a supply pipe, C, which is provided with a valve $c$ adapted to be operated automatically by any suitable mechanism for wholly or partially opening or closing the pipe and thereby controlling the discharge of water from the pipe, suitable automatic mechanism for this purpose being hereinafter described. For venting purposes the priming tank A is entirely open to atmosphere at top, while the main tank B is preferably vented through a tube E the lower end of which communicates with the main tank, at the top thereof, while its upper end communicates with the atmosphere. This tube is preferably integral with the bottom of the priming tank and rises up within the priming tank to a level sufficiently high to cause a sufficient quantity of liquid for priming the siphon to accumulate in the priming tank before said liquid reaches the level of the upper end of the tube. When it reaches this level (which it may or may not do, depending upon conditions hereinafter fully described) it will overflow the upper end of the tube and flow downward therethrough and into the main tank, augmenting the quantity of liquid therein.

The term "tube" as herein used is intended to comprehend any passage or duct through which air or liquid may pass, however such passage or duct may be formed or constructed.

The bottom of the priming tank has an opening through which passes the uptake leg L, of the siphon D, a tight joint between them being formed by a flange $l$ formed on the siphon and resting upon and suitably secured to the margin of said bottom immediately adjacent to said opening. The siphon comprises two branches or legs, L and L', separated by a wall or partition $l'$ and connected at their upper ends by a U-shaped bend $l''$ forming the crown of the siphon. The dividing wall or partition $l'$ is continued outward to form a fin L'' which extends laterally beyond the legs of the siphon and longitudinally from a point somewhat above the crown of the siphon to a point somewhat below the short or uptake leg thereof. The vertical wall of the box G is provided with a vertical opening equal in width to the diameter of a leg of the siphon, through which the short or uptake leg may be inserted laterally to bring the fin L'' into contact with the outside surface of the margin of the vertical wall of the box, immediately adjacent to said opening, the fin being secured to said margin liquid tight, by any suitable means.

The priming and main tanks may be of any desired dimensions that will meet the requirements of the invention. These requirements are met and satisfied if the priming tank is of sufficient capacity to hold enough or more than enough water to prime the siphon when either its entire contents or a sufficient quantity thereof is rapidly discharged into the main tank. The top $d$ or dam of the overflow wall or partition $l'$ must be located at such a low level that when the necessary quantity of liquid is discharged from the priming tank with the necessary rapidity it will cause the liquid to rise in the uptake leg of the siphon and fill the crown thereof and thereafter pass downward through the downtake leg and start the siphonic action, and, at the same time, at such a high level that the liquid cannot rise in the uptake leg and trickle over the overflow wall and into the downtake leg, before such priming action does take place. To this end, the priming and main tanks communicate through an opening of such size and capacity formed through the wall which separates them—the bottom A' of the priming tank—that when said opening is unobstructed the necessary quantity of liquid may flow from the priming tank into the main tank at the necessary velocity. This opening is surrounded by a valve-seat adapted to receive a buoyant valve, N', which may be of any desired construction that will meet the requirements of the invention. The unseating of this valve is accomplished by subjecting it to a sufficient force acting upwardly upon it to overcome the force acting downwardly upon it and tending to hold it seated. The downward force is the resultant of the weight of the valve itself and the weight of the column of liquid acting downwardly upon it, while the upward force is the resultant of the buoyancy of the valve itself and the weight of the column of liquid acting upwardly upon it. For the purposes of this specification, it is not necessary to here state with mathematical accuracy the various factors which must be taken into consideration in designing and constructing a flushing apparatus that will have the mode of operation contemplated by the invention. On the contrary, the foregoing general statements, taken in connection with a detail description of the mode of operation of the species or form of apparatus shown in the drawing, for bringing about the priming action will suffice.

Assuming that both tanks are empty, as the liquid is introduced into the priming tank its level will gradually rise therein and may reach the level of the upper end of the tube E. At any rate when the liquid submerges the valve N', a column of liquid will be formed, and this column will be superimposed upon the valve and produce thereon a downward pressure, proportional to the height or weight of the column, tending to hold it seated. It is this downward force that must be overcome in order to unseat the valve, and in the species of the apparatus shown in the drawing this is accomplished by the following means:—The sewage or other liquid to be disposed of is discharged directly into the main tank by a pipe C' opening thereinto near the top thereof. A short, externally threaded tube O is screwed into the opening through the bottom A' of the priming tank, through which the latter communicates with the main tank. Its upper end is flared and shaped to form a seat $o$ for the valve N' whence it extends downward to a level far enough below the level of the valve seat to form, beneath the valve, an air-pressure chamber $o'$ of sufficient depth and capacity for the purpose hereinafter described. Depending from the valve is a stem or rod, Q, which acts as a guide for guiding the valve to and from its seat and also as a stop for limiting the movement of the valve away from its seat. To these ends a spider R is arranged in the tube O and from this spider depends a tube R' through which the rod passes and whereby the valve is guided, and the rod is provided with a shoulder, preferably in the form of a nut Q' turned onto it and adapted to contact with the lower end of the tube R', thereby forming a stop for limiting the movement of the valve away from its seat.

In the operation of this apparatus it is the intention that the sewage or other liquid introduced into the main tank shall never come in contact with the valve N' although the column formed by the rising of the liquid in the main tank, the uptake leg of this siphon and the vent tube E does produce and exert upon the under side of the valve an upward pressure, but this upward pressure is exerted through the medium of a body of air which becomes trapped and confined in the air-pressure chamber o when the liquid in the main tank reaches the level of the lower end of the tube O. As the liquid continues to rise in the main tank, the uptake leg of the siphon and the tube E, it forms a column of which the level of the lower end of the tube O, or the bottom of the air-pressure chamber is the base. As this column increases in height, the upward pressure upon the air in the air-pressure chamber also increases until the column reaches the height necessary to produce upon said air, and through it upon the under side of the valve, sufficient pressure to unseat it. This unseating of the valve will not be due wholly to its buoyancy and the direct upward pressure upon it, but it will be due in part also to the explosive-like expansion of the compressed air within the chamber when it is released. In fact, the force of this explosive-like action is so great that even if the valve be of greater specific gravity than the liquid in the priming tank, it will be blown from its seat. This mode of operation is important in a flushing tank used in a sewage system, because it prevents the liquid contents of the main tank, which may contain more or less solid matter, from reaching and fouling the valve-seat. This is because, the instant the valve leaves its seat the water will commence flowing from the priming tank into the main tank and thereby start a downward flow of clean water which not only overcomes and forces back into the main tank the water which has a tendency to rise into the priming tank, but also washes the valve-seat and keeps it clean.

The stem of the valve c in the pipe C for discharging water into the priming tank is provided with a lever-arm c' the outer end of which is jointed by a pin c'' to the upper end of a rod T extending downward through the tube E. A second tube T' passes through the tube E and is supported therein by a spider T'', and the rod T passes through this tube, whereby it is guided and confined to an endwise, upward and downward, practically rectilinear movement. The guiding tube T' extends from a sufficiently high level within the tube E downward to a sufficiently low level below the lower end thereof. Its upper and lower ends, acting in conjunction with nuts t and t' turned onto threaded portions of the rod T, form adjustable stops for limiting or arresting the closing and opening movements of the valve, respectively. The opening of the valve is effected by the buoyancy of a float U which is adjustably secured to the rod between the nut t' and a second nut t''. The closing movement of the valve is effected by the weight of the float U, and the stop nut t may be adjusted to such position that the valve may be completely closed, thereby completely cutting off the supply of water from the pipe C into the priming tank, or arrested at any intermediate point in its permitted range of movement, thereby permitting a stream of water of greater or less volume to flow constantly from the pipe C into the priming tank. The opening movement of the valve c is effected by the upward movement of the float, due to its buoyancy, when the liquid in the main tank rises to a sufficiently high level to submerge it, more or less, and the extent of this opening of the valve may be regulated or stopped by adjusting the nut t' to the proper position with relation to the lower end of the guiding tube T'. The float U must be of sufficient buoyancy or displacement to open the valve c as far as desired and at the same time this float and other parts must be so constructed and proportioned that the necessary quantity of water for priming the siphon will have been delivered into the priming tank at least as soon as the column of liquid for unseating the valve is formed, however it may be formed. To be more specific, as the liquid rises in the main tank, and reaches the level of the lower end of the tube O it will trap the air in the chamber o' and then continue to rise and form, or build up, as it were, the unseating column until it reaches the necessary height. This column will then unseat the valve N' and this unseating will take place regardless of the quantity or level of the liquid in the priming tank, but at the time the valve N' is unseated the priming tank must contain a sufficient quantity of water to prime the siphon, regardless of its level in the priming tank. It may stand at a level below the top of the tube E, or it may stand at a sufficiently high level to overflow the top of said tube, and flow downward into the main tank and thus augment the quantity of liquid in the main tank and thus assist in forming or building up the unseating column. It is desirable that this latter condition should not take place before, or at any rate not much before the valve is unseated, because the primary object of the present invention is to discharge the liquid contents of the main tank, while the object of the primary tank is a secondary one, namely, to start the discharge of the liquid from the main tank. Hence a minimum quantity of water for priming the siphon should be used, because whatever quantity is used, adds to the cost of maintenance.

What I claim as new and desire to secure by Letters Patent is:—

1. In a sewage system the combination of a main tank, a pipe for discharging directly thereinto the liquid to be disposed of, a discharge siphon communicating with the main tank, a priming tank having an opening for the outlet of liquid communicating directly with the main tank, said opening being of sufficient capacity to permit the rapid discharge of the contents of the priming tank into the main tank for priming the siphon, a valve for controlling said opening, means whereby as the liquid in the main tank rises fluid pressure is exerted against the under side of said valve, a pipe for discharging into the priming tank a sufficient quantity of clear liquid from a source other than the aforesaid liquid to be disposed of to prime the siphon, a stop-cock in said pipe, means operated by the liquid in the main tank for opening and closing said stop-cock when the liquid in the main tank reaches certain predetermined high and low levels, respectively, and means for discharging the contents of the main tank.

2. In a sewage system the combination of a main tank, a pipe for discharging directly thereinto the liquid to be disposed of, a discharge siphon communicating with the main tank, a priming tank having an opening for the outlet of liquid communicating with the main tank, a valve for controlling said opening, a pipe for discharging into the priming tank a sufficient quantity of clear liquid from a source other than the aforesaid liquid to be disposed of to prime the siphon, a stop-cock in said pipe, means operated by the liquid in the main tank for opening and closing said stop-cock when the liquid in the main tank reaches certain predetermined low and high levels, respectively, a siphon for discharging the contents of the main tank and means whereby as the liquid in the main tank rises therein, fluid pressure is exerted immediately against the under side of the valve aforesaid, which pressure acts directly upward against the under side of the valve and unseats it.

PATRICK J. MADDEN.

Witnesses:
L. M. HOPKINS,
R. H. HUNTSMAN.

---

Copies of this patent may be obtained for five cents each, by addressing the "Commissioner of Patents, Washington, D. C."